United States Patent [19]

Ueki et al.

[11] Patent Number: 5,486,329
[45] Date of Patent: Jan. 23, 1996

[54] AUTOMOTIVE DOOR TRIM AND METHOD FOR FABRICATING THE SAME

[75] Inventors: Katsuji Ueki; Toyokazu Endo, both of Kanagawa, Japan

[73] Assignee: Kasai Kogyo Co., Ltd., Tokyo, Japan

[21] Appl. No.: 403,562

[22] Filed: Mar. 14, 1995

Related U.S. Application Data

[63] Continuation of Ser. No. 206,284, Mar. 7, 1994, abandoned, which is a continuation of Ser. No. 968,411, Dec. 7, 1992, abandoned, which is a division of Ser. No. 796,668, Nov. 25, 1991, abandoned.

[51] Int. Cl.⁶ ................................................ B29C 43/00
[52] U.S. Cl. .................... 264/273; 156/244.22; 156/245
[58] Field of Search .............................. 29/527.1, 527.2, 29/527.3, 897.2; 264/259, 273; 156/242, 244.18, 244.22, 244.25, 245; 52/312, 716.5, 717.04, 717.05

[56] References Cited

U.S. PATENT DOCUMENTS

| | | |
|---|---|---|
| 2,837,455 | 6/1958 | Wolf . |
| 3,715,256 | 2/1973 | Truesdell et al. ................. 156/244 |
| 3,740,918 | 6/1973 | Meyer ................. 29/897.2 X |
| 3,821,052 | 6/1974 | Tanzer ................. 156/250 |
| 4,004,774 | 1/1977 | Houston ................. 249/114 |
| 4,740,417 | 4/1988 | Tornero ................. 156/245 X |
| 4,758,395 | 7/1988 | Zion ................. 264/258 X |
| 4,873,045 | 10/1989 | Fujita et al. ................. 264/259 |
| 4,923,539 | 5/1990 | Spengler et al. ................. 156/245 X |
| 5,117,549 | 6/1992 | Gaudreau ................. 29/897.2 X |
| 5,151,237 | 9/1992 | Hettinga ................. 264/273 X |

FOREIGN PATENT DOCUMENTS

| | | | |
|---|---|---|---|
| 52-11520 | 1/1977 | Japan | ................. 29/469.5 |
| 61-68230 | 4/1986 | Japan | ................. 29/897.2 |
| 544878 | 4/1942 | United Kingdom . | |

*Primary Examiner*—S. Thomas Hughes
*Attorney, Agent, or Firm*—Dickstein, Shapiro & Morin

[57] ABSTRACT

An automotive interior component such as an automotive door trim comprising a main body integrally combining a resin core member and a surface skin member by a mold press forming process and an attachment member attached to a part of the main body, in which the attachment member is attached to the main body by way of connecting parts of the resin core member during the process of mold press forming. The connecting part may consist of an extension of the resin core member which is pushed out of openings provided in the surface skin member and adhered to the attachment member. Alternatively, the connecting part may consist of parts of the resin core member into which engagement pawls provided in the attachment member, in particular, an attachment core member thereof are penetrated through the surface skin member. In either case, solidification of the connecting parts completes the attachment of the automotive door trim. Thus, the process of mounting the attachment member is simplified, and accurate positioning of the attachment member can be achieved.

4 Claims, 10 Drawing Sheets

5,486,329

AUTOMOTIVE DOOR TRIM AND METHOD FOR FABRICATING THE SAME

This application is a continuation of application Ser. No. 08/206,284 filed Mar. 7, 1994, now abandoned, which is a continuation of Ser. No. 07/968,411 filed Dec. 7 1992 now abandoned, which is a divisional of application Ser. No. 07/796,668 filed Nov. 25, 1991 now abandoned.

TECHNICAL FIELD

The present invention relates to an automotive interior component such as an automotive door trim and a method for fabricating the same.

BACKGROUND OF THE INVENTION

Typically, to the end of improving the comfort of the passenger compartment of an automobile, the grade of the material for the interior components such as automotive door trims is improved or ornamental materials such as cloth and carpet are attached to the surface of the door trims.

FIGS. 14 and 15 show perspective and sectional views of an automotive door trim, and this conventional door trim 1 essentially consists of a door trim main body 4 consisting of a core member 2 formed into a desired shape, and a surface skin member 3 which is integrally attached to the surface of the resin core member 2, and an attachment member 5 which is mounted on a suitable location of the surface of the door trim main body 4 for ornamental purpose.

As shown in FIG. 15, the attachment member 5 is formed by laminating an attachment pad member 5b consisting of such material as urethane foam having a suitable cushioning capability over the surface of an attachment core member 5a having a supporting capability, covering the outer surface of this assembly with an attachment surface skin member 5c made of such materials as synthetic leather and cloth, and folding back a peripheral edge of the attachment surface skin member 5c over a peripheral part of the reverse surface of the attachment core member 5a.

To attach the attachment member 5 having such a structure to the door trim main body 4, pawls 6 made of steel plate are provided in the attachment core member 6 of the attachment member 5, and corresponding mounting holes 4a are provided in the door trim main body 4. The attachment member 5 is attached to the door trim main body 4 by inserting the pawls in the mounting holes 4a and bending the tips of the pawls 6.

In this conventional automotive door trim 1, since the pawls 6 provided in the attachment core member 5a are inserted in the mounting holes 4a of the door trim main body 4 and the pawls 6 are bent for securing purpose, it was necessary to provide the mounting holes 4a in positions precisely corresponding to the pawls 6 of the attachment member 5, and this contributed to the increase in the cost of the product due to the complication of the fabrication steps.

Further, since inserting the pawls provided in the attachment member 5 in the mounting holes 4a of the door trim main body 4 is required to be carried out without the benefit of any visual aid, the work efficiency is extremely low. The need for the step to bend the pawls presents an additional complication to the fabrication process.

Furthermore, the pawls 6 are not capable of accurately joining the attachment member 5 to the door trim main body 4, and the gap which often develops between the peripheral part of the attachment member 5 and the door trim main body 4 impairs the appearance of the door trim 1. In an extreme case, the attachment member 5 may become so displaced from its proper position due to vibrations of the automobile during its motion that the attachment member 5 may be placed in an unstable condition.

BRIEF SUMMARY OF THE INVENTION

In view of such problems of the prior art, an automotive interior component such as an automotive door trim cam be efficiently fabricated. This automotive interior component integrally combines a mold press formed door trim member with an attachment member.

A second object of the present invention is to provide such an automotive interior component which is provided with a favorable appearance owing to the accurate positioning of the attachment member.

A third object of the present invention is to provide a method for efficiently fabricating such an automotive interior component.

These and other objects of the present invention can be accomplished by providing an automotive interior component such as an automotive door trim comprising a main body integrally combining a resin core member and a surface skin member by a mold press forming process and an attachment member attached to a part of the main body, wherein: the attachment member is attached to the main body by way of a connecting part of the resin core member still at least in semi molten state as a result of the mold press forming process, the connecting part eventually solidifying so as to achieve a secure engagement between the resin core member and the attachment member.

The connecting part may consist of an extension of the resin core member which is pushed out of openings provided in the surface skin member and adhered to the attachment member. In this case, the extension may be adhered to an attachment core member of the attachment member having a resin compatibility or to an attachment surface skin member made of fabric sheet so as to ensure a secure attachment.

Alternatively, the connecting part may consist of parts of the resin core member into which engagement pawls provided in the attachment member, in particular, an attachment core member thereof are penetrated through the surface skin member. In this case, the engagement pawls may be provided with notches or openings, or may be slanted so as to ensure a secure anchoring of the engagement pawls in the resin core member of the main body. Preferably, the attachment member comprises an attachment core member consisting of metallic plate, and the engagement pawls are formed in the attachment core member by cutting out tabs from the metallic plate and bending them.

In either case, solidification of the connecting parts completes the attachment of the automotive door trim. Thus, the process of mounting the attachment member is simplified, and accurate positioning of the attachment member can be achieved at the same time.

BRIEF DESCRIPTION OF THE DRAWINGS

Now the present invention is described in the following in terms of specific embodiments with reference to the appended drawings, in which.

DETAILED DESCRIPTION OF THE PREFERRED EMBODIMENTS

Figure 1:
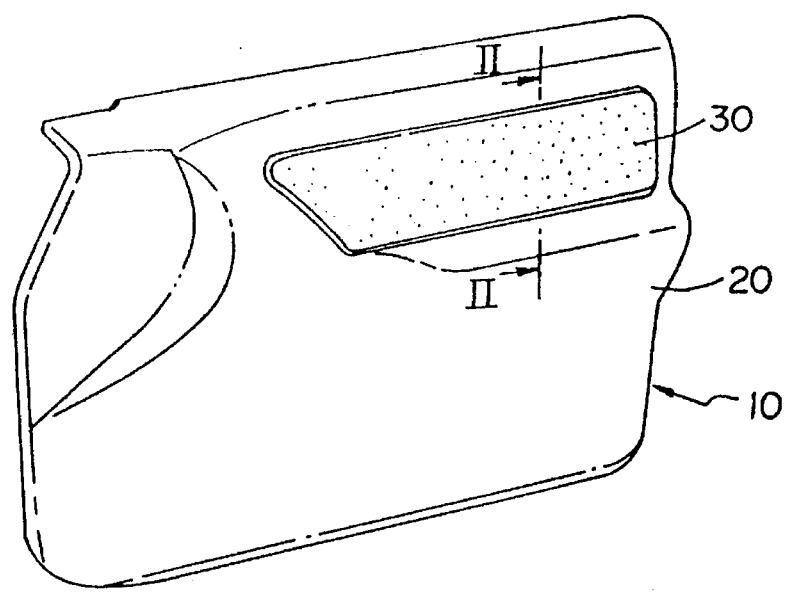
FIG. 1 is a perspective view showing an automotive door trim to which the present invention is applied.
Figure 2:
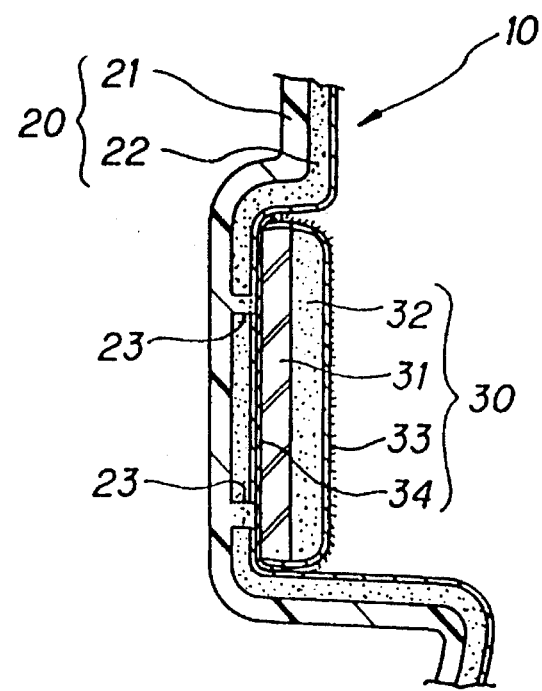
FIG. 2 is a sectional view taken along line II—II of FIG. 1.

Referring to FIGS. 1 and 2, the automotive door trim 10 essentially consists of a door trim main body 20, and an attachment member 30 mounted on a suitable part of the surface of the door trim member 20.

Specifically, the door trim main body 20 consists of a resin core member 21 formed into a required shape by a mold press forming, and a surface skin member 22 integrally attached over the surface of the resin core member 21. The resin core member 21 is made of composite resin material consisting of polypropylene mixed with a filler material such as talc so that a desired moldability, low cost and high mechanical strength may be achieved. The surface skin member may typically consist of a sheet such as a PVC sheet mixed with ABS resin laminated with a layer of polypropylene foam or polyethylene foam.

In the attachment member 30, an attachment pad member 32 such as polyurethane foam is laminated over the surface of an attachment core member 31 such as hard board, and an attachment surface skin member 33 made of such materials as cloth and synthetic leather is placed over the outer surface of this assembly with a peripheral part of the attachment surface skin member 33 folded back onto the reverse surface of the attachment core member 31. Further, to achieve a favorable adhesion to the door trim main body 20, polyolefin film 34 is laminated over the reverse surface of the attachment core member 31.

The door trim main body 20 and the attachment member 30 are securely attached to each other since the resin core member 21 and the polyolefin film 34 on the reverse surface of the attachment core member 31 are securely joined together through a favorable resin compatibility by way of a plurality of openings 23 provided in the surface skin member 22.

Therefore, according to the structure of the automotive door trim 10 of the present invention, it is possible to omit the pawls for engagement which were used for mounting the attachment member by being bent in the conventional structure, and the attachment member 30 can be mounted without involving any wobbling or dislocation.

Figure 3:
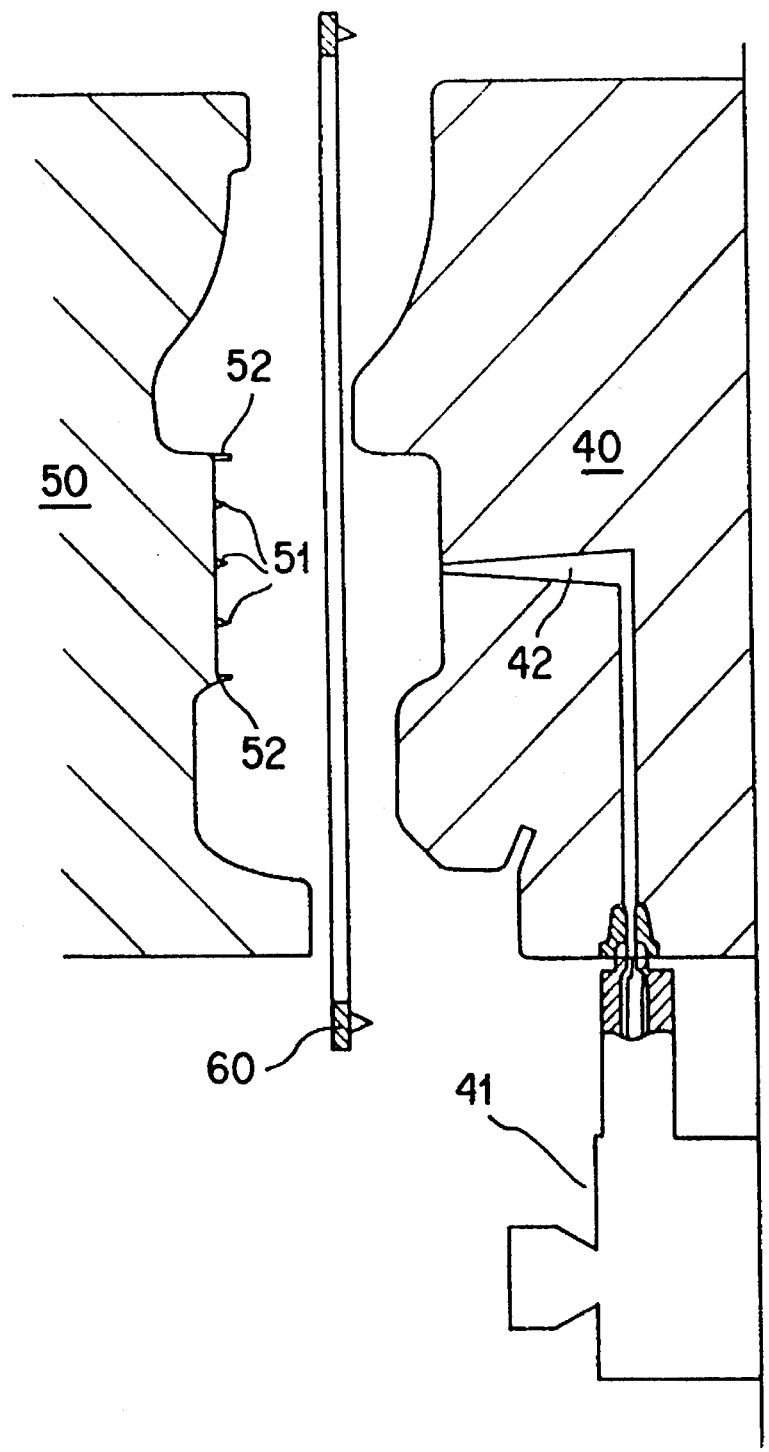
FIG. 3 is a sectional view showing the structure of a mold press forming device which may be used to fabricate the automotive door trim according to the method of the present invention.

FIG. 3 is a sectional view showing the structure of the device for mold press forming which can be employed for carrying out the method of the present invention, and this molding device comprises a lower die 40 for mold press forming and an upper die 50 for mold press forming which is located above the lower die and provided with a substantially same die surface. The upper die 50 can be moved vertically by a lifting device not shown in the drawings, and can be engaged with the lower die 40 defining a small gap therebetween.

An extruder 41 is attached to this lower die 40 for mold press forming, and the lower die 40 is provided with gates 42 for distributing the resin material in semi molten state from the extruder 41 over the die surface of the lower die 40.

An annular support frame 60 is provided between the upper and lower dies 40 and 50 for mold press forming to support the peripheral part of the surface skin member 22.

The upper die 50 for mold press forming is provided with an attachment member retaining means for setting up the attachment member 30. According to the present embodiment, the retaining means consists of a plurality of needles 51 for retaining the attachment member 30, and the upper die 50 is provided with a guide wall for accurate positioning of the attachment member 30 on the die surface of the upper die 50.

Now, referring to FIG. 4 and 5, the process of fabricating the automotive door trim 10 is described in the following.

Figure 4:
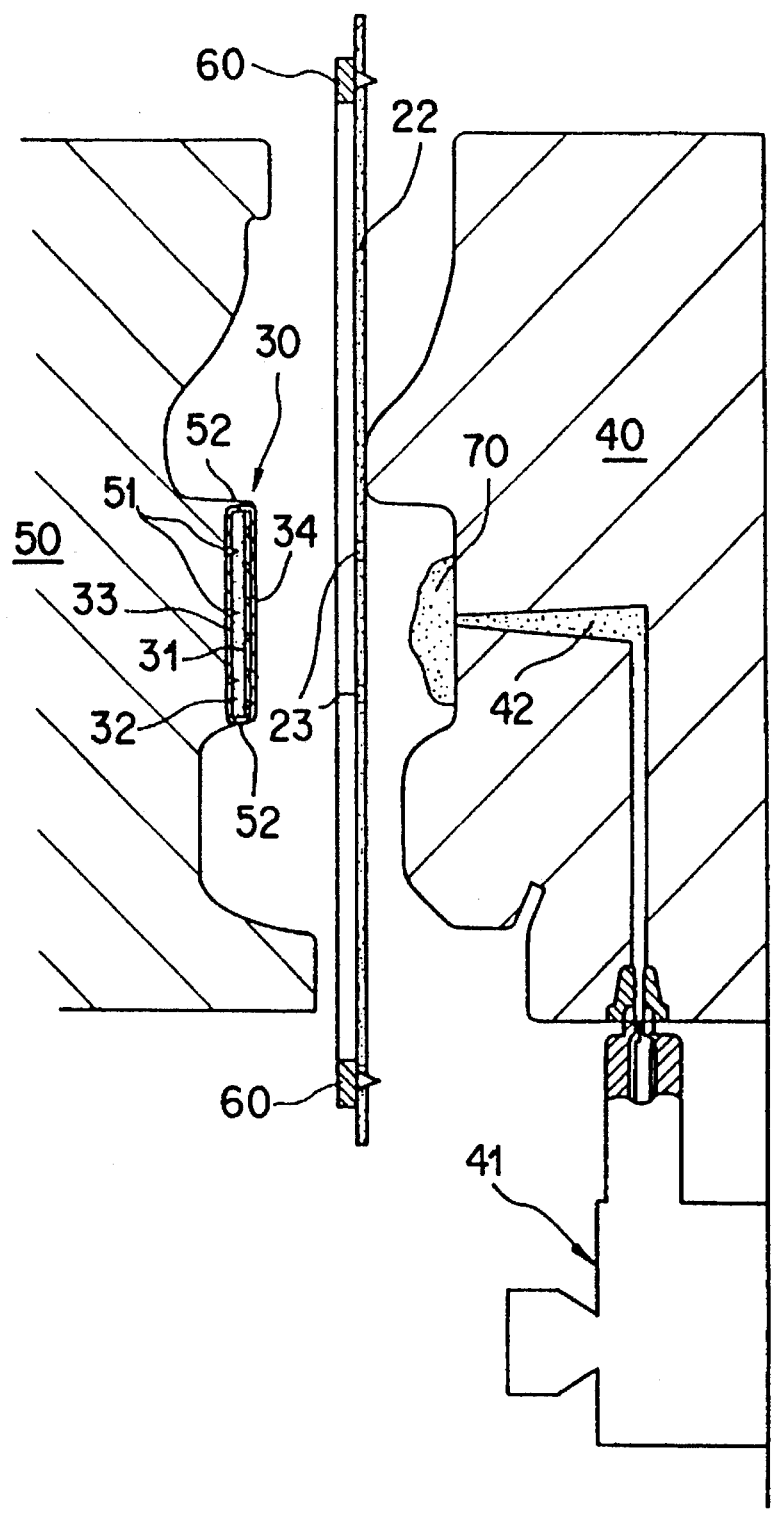
FIG. 4 is a sectional view showing a step of setting up and supplying the material.

As shown in FIG. 4, with the upper and lower dies 40 and 50 for mold press forming opened up, the peripheral part of the surface skin member 22 is retained by the support frame 60, and is heated by a heating device not shown in the drawings.

The temperature condition of this heating process may vary depending on the material. In the case of a laminated sheet consisting of a PVC sheet lined with polyethylene foam, the surface temperature of the surface skin member 22 may be in the range of 100° to 120° C. In the cases of a simple PVC sheet and a simple foamed PVC sheet, the surface temperature of the surface skin member 22 may be in the range of 80° to 100° C.

Then, the attachment member 30 is placed on the upper die 50 for mold press forming as illustrated in FIG. 4. Substantially at the same time as setting up the surface skin member 22 and the attachment member 30, composite PP resin material 70 in semi molten state is distributed over the die surface of the lower die 40 for mold press forming from three gates 42 provided in suitable locations.

In this material setting up step, the openings 23 provided in the surface skin member 22 are located in a region spaced inwardly 5 to 20 mm from the peripheral edge of the attachment member 30, and are each 10 mm in diameter and distributed at the pitch of 50 to 100 mm. These openings 23 may be formed either before or after the surface skin member 22 is retained by the retaining frame 60.

Thereafter, the upper die 50 carrying the attachment member 30 is lowered and the upper and lower dies for mold press forming are engaged to each other leaving a prescribed clearance therebetween. The press pressure in this step is 80 kg/cm$^2$ and the time duration of pressure application is 40 seconds.

By this mold press forming, the resin material 70 is formed into a resin core member 21 of a desired shape, and a surface skin member 22 is integrally attached to the resin core member 21 so as to form a completed door trim main body 20.

During this step, the resin material 70 is exposed to the surface of surface skin member 22 through the openings 23 provided in the surface skin member 22 and comes into contact with the attachment core member 31 of the attachment member 30 so that the resin core member 21 and the attachment member 30 may be securely bonded or adhered to each other by virtue of the resin compatibility between the polyolefin film 34 and the resin material 70.

When the molded object is removed from the upper and lower dies for mold press forming by opening them up, an automotive door trim 10 as illustrated in FIGS. 1 and 2 can be obtained.

In this embodiment, the polyolefin film 34 was laminated over the reverse surface of the attachment core member 31 to improve its adhesion to the resin 10 core member 21, but it is possible to omit the polyolefin film 34 if a resin plate containing polypropylene at least partly therein is used instead of the hard board as the material for the attachment resin core member 31 whereby the overall structure may be simplified.

Figure 6:
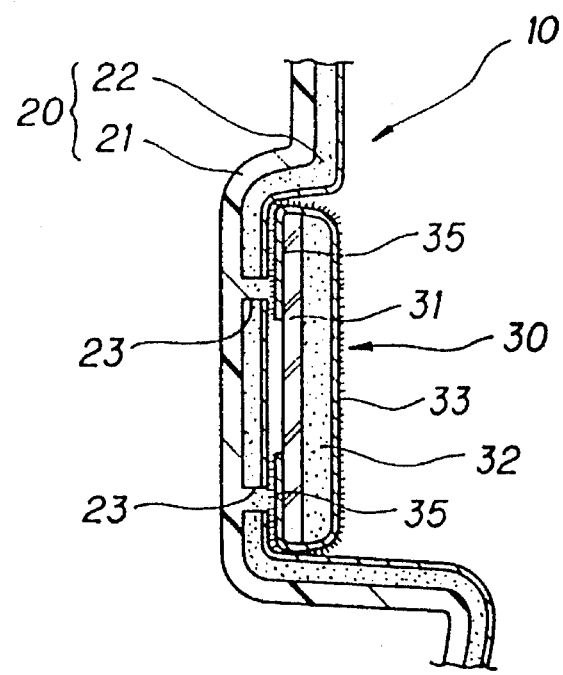
FIG. 6 is a sectional view similar to FIG. 2 showing a second embodiment of the present invention.

Further, as illustrated in FIG. 6, if a fabric sheet such as cloth is used for the attachment surface skin member 33 of the attachment member, and the folded-back portion 35 along the peripheral edge of the attachment surface skin member is made larger than in the previous embodiment so that the folded-back portion 35 of the attachment surface skin member 33 may be contacted by the resin material through the openings 23 of the surface skin member 22, the door trim member 20 and the attachment member 30 are securely joined to each other by an anchoring effect owing to intrusion of the resin material 70 into the fibers of the attachment surface skin member 33.

According to this embodiment, since the film for improving the adhesion to the attachment core member 31 can be omitted, and the material of the attachment core member 31 is not required to be compatible with the resin core member 31, it is possible to use an arbitrary material for the attachment core member 31.

As described above, the first and second embodiments offer the following advantages:

(1) Since the attachment member is securely attached to the trim main body by exposing the molten resin for forming the resin core member from the reverse surface of the trim main body through the openings provided in the surface skin member, it is possible to achieve a secure bonding compared to the conventional structure involving the bending of pawls, and the appearance of the peripheral part of the attachment member can be improved in addition to the advantage of a highly secure attachment without involving any wobbliness and dislocation of the attachment member.

(2) Since the attachment member is integrally mounted during the process of mold press forming the trim main body, the step of forming holes in the trim main body can be omitted, and the fabrication process can be simplified.

(3) Since the attachment member is integrally mounted during the process of mold press forming the trim main body, the cumbersome step of mounting the attachment member on the molded trim main body by bending the pawls can be omitted, and the fabrication process can be significantly simplified.

Figure 7:
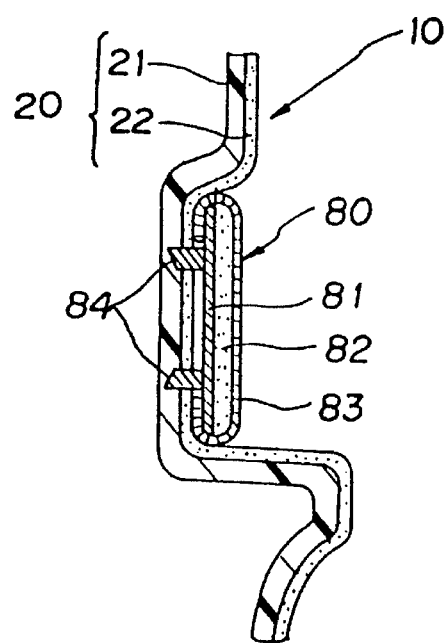
FIG. 7 is a sectional view similar to FIG. 2 showing a third embodiment of the present invention.

FIG. 7 shows a third embodiment of the present invention which is based on a slightly different principle from that of the preceding embodiments.

Referring to FIG. 7, in the attachment member 80, an attachment pad member 82 such as polyurethane foam is laminated over the surface of an attachment core member 81 made of steel plate, and an attachment surface skin member 83 made of such materials as cloth and synthetic leather is placed over the outer surface of this assembly with a peripheral part of the attachment surface skin member 83 folded back onto the reverse surface of the attachment core member 81.

The attachment core member 81 is provided with a plurality of engagement pawls 84 formed as tabs which are cut out and lifted from the attachment core member 81, and these engagement pawls 84 are passed through the surface skin member 22 of the door trim main body 20 and fixedly embedded or penetrated in the resin core member 21 at their free ends.

Thus, according to the automotive door trim 10 of the present invention, since the engagement pawls 84 of the attachment member 80 are fixedly anchored in the resin core member 21 of the door trim main body 20, it is possible to achieve a stable and secure attachment without involving any gap around the peripheral part of the attachment member with a favorable appearance as opposed to the conventional structure involving bending of pawls.

Figure 8:
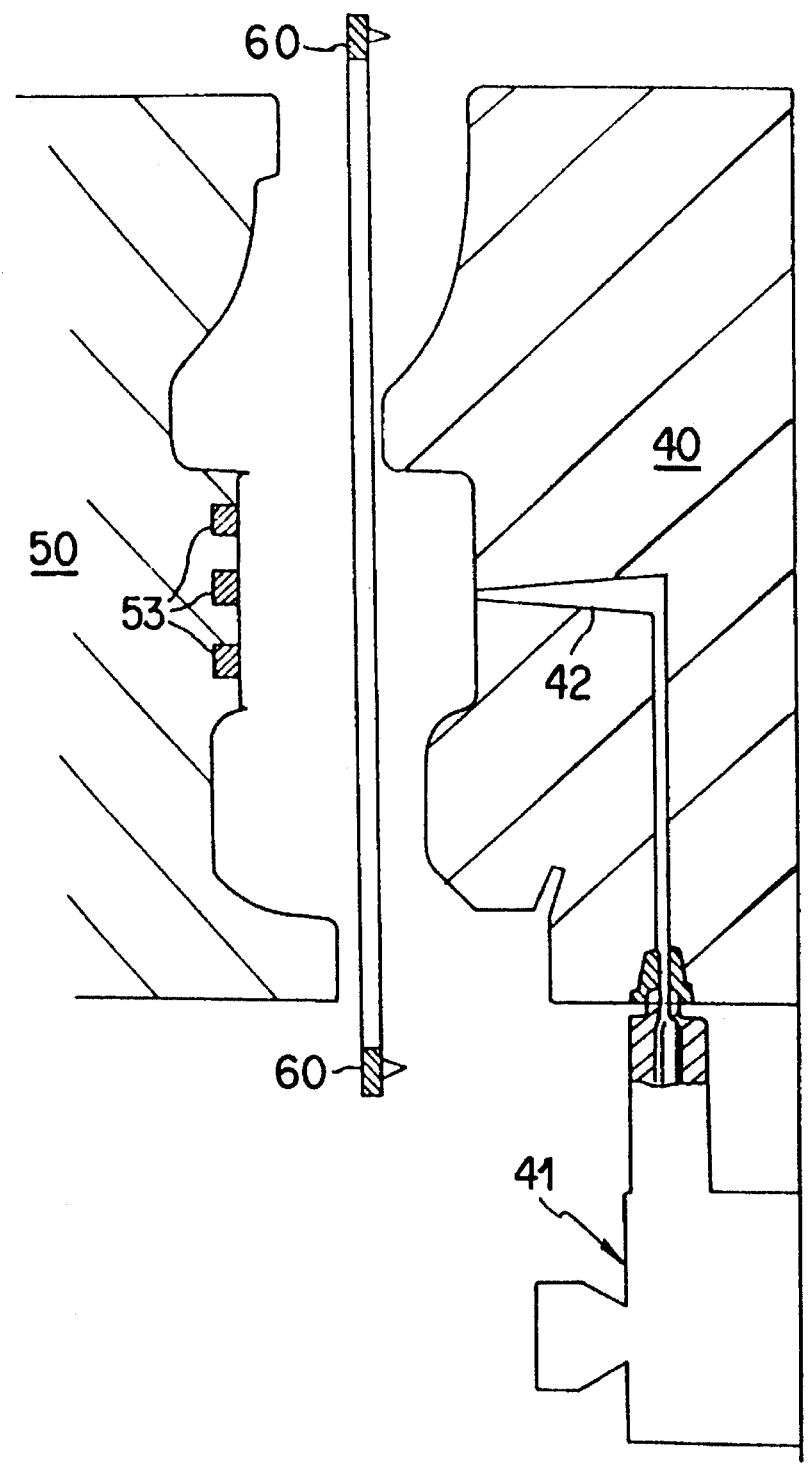
FIG. 8 is a sectional view showing the structure of a mold press forming device which may be used to fabricate the third embodiment of the automotive door trim according the present invention.

FIG. 8 is a sectional view showing the structure of the device for mold press forming which can be employed for carrying out the method of the present invention for fabricating the automotive door trim 10 illustrated in FIG. 7, and this molding device comprises a lower die 40 for mold press forming and an upper die 50 for mold press forming which is located above the lower die and provided with a substantially same die surface. The upper die 50 can be moved vertically by a lifting device not shown in the drawings, and can be engaged with the lower die 40 defining a small gap therebetween.

Between the lower die 40 and the upper die 50 for mold press forming is provided an annular support frame 60 for setting up the surface skin member 22, and the upper die 50 for mold press forming is provided with retaining means for retaining the attachment member 80.

Since the attachment core member 81 of the attachment member 80 is made of steel plate, the retaining means provided in the upper die 50 consists of magnets 53 so that the attachment member 80 may be retained on the die surface by the magnetic attraction between the magnets 53 and the attachment core member 81.

An extruder 41 is attached to this lower die 40 for mold press forming, and the lower die 40 is provided with passages or gates 42 for distributing the resin material in semi molten state from the extruder 41 over the die surface of the lower die 40.

Now, referring to FIG. 9 and 10, the process of fabricating the automotive door trim 10 illustrated in FIG. 7 is described in the following.

Figure 9:
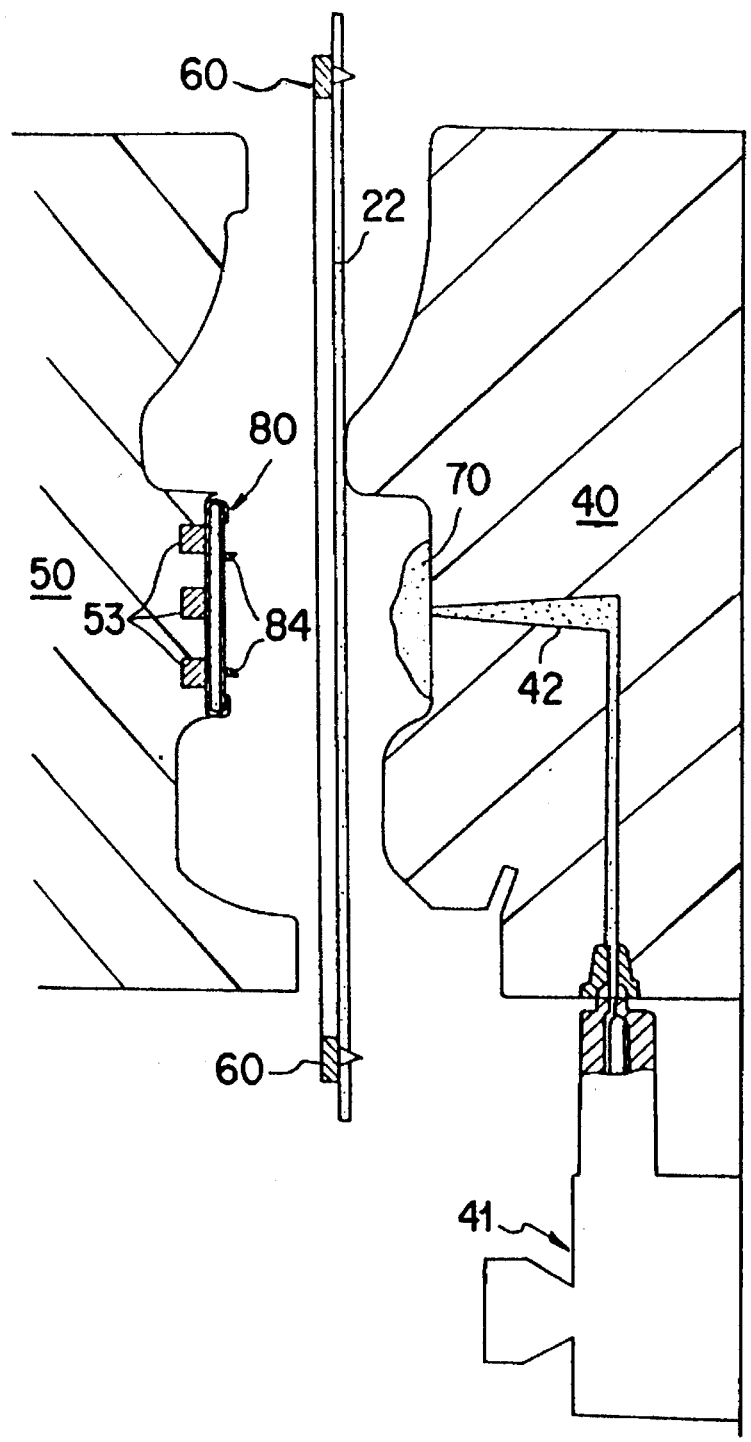
FIG. 9 and 10 are views similar to FIGS. 4 and 5, respectively, showing different steps of the operation of the device shown in FIG. 8.

As shown in FIG. 9, with the upper and lower dies 40 and 50 for mold press forming opened up, the peripheral part of the surface skin member 22 is retained by the support frame 60 with the attachment member 80 placed on the die surface of the upper die 50 for mold press forming.

Figure 5:
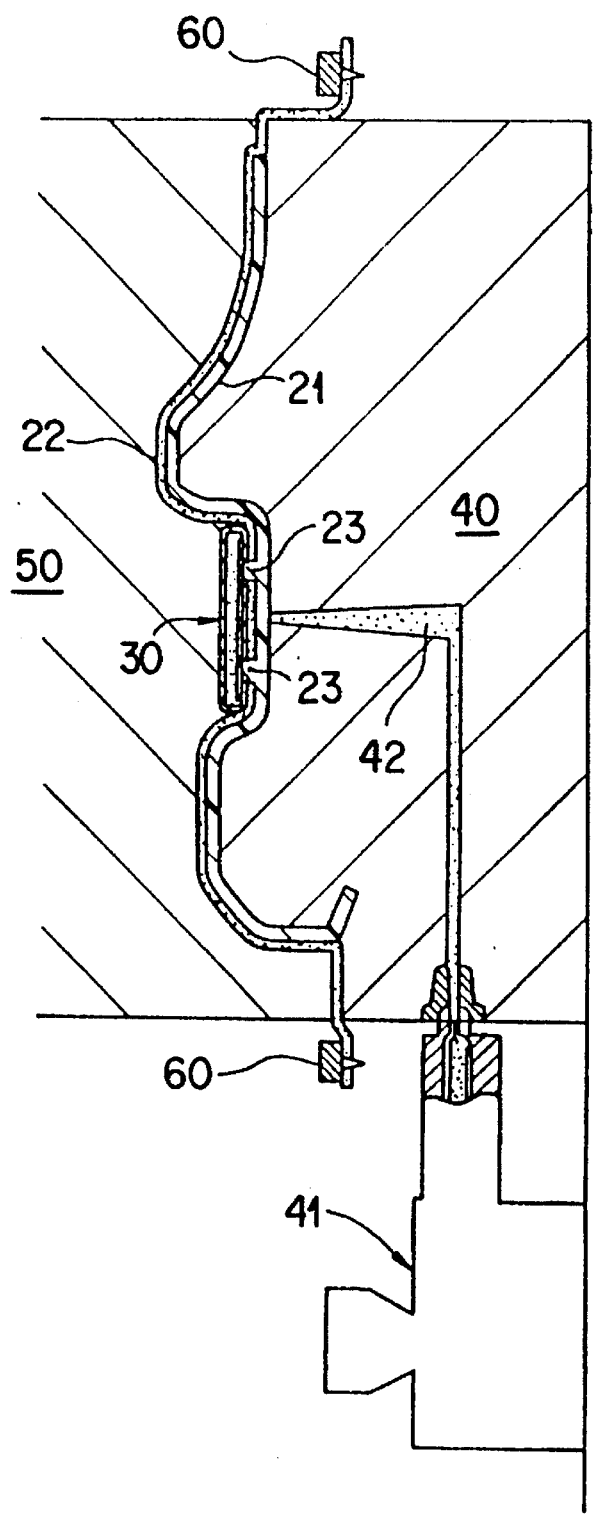
FIG. 5 is a sectional view showing a step of mold press forming.

At this time point, the surface skin member 22 is preheated to a prescribed temperature in the same manner as mentioned in connection with FIG. 4 and 5.

The attachment core member 81 is magnetically attracted to the magnets 53 embedded in the upper die 50 for mold press forming, and the attachment core member 81 is thereby magnetically and securely attached to the die surface of the upper die 50 for mold press forming. The engagement pawls 84 lifted from the attachment core member 81 are directed downward.

A prescribed amount of the semi molten resin material 70 is supplied to and distributed over the die surface of the lower die 40 for mold press forming by way of the extruder 41 and the gates 42 for supplying resin material.

Figure 10:
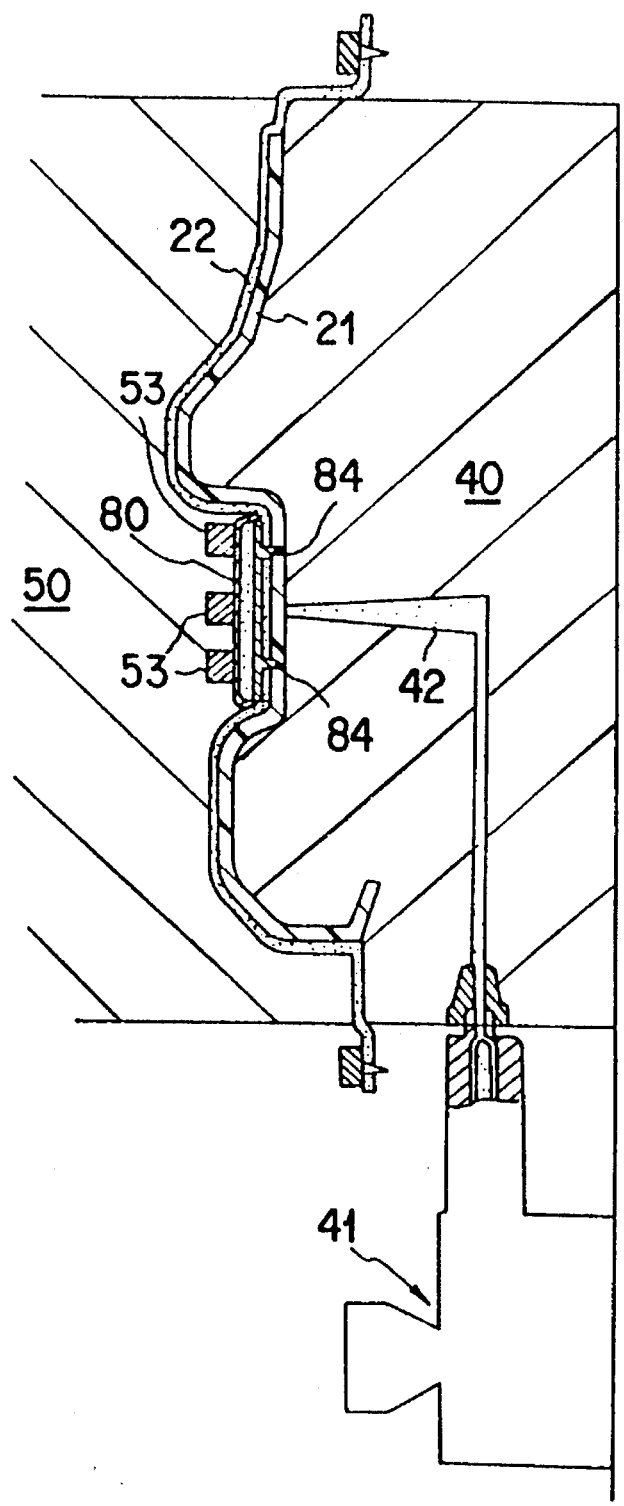

Thereafter, the upper die 50 for mold press forming is lowered as illustrated in FIG. 10, and the upper and lower dies 40 and 50 for mold press forming are engaged to each other leaving a prescribed clearance therebetween. The press pressure was 80 kg/cm$^2$, and the time duration of pressure application was 40 seconds.

The resin material 70 is formed into a desired curved shape by this mold press forming, and a surface skin member 22 is integrally attached to the surface of the resin core member 21.

At this point, the engagement pawls 84 provided in the attachment core member 81 are passed through the surface skin member 22, and are forced into the resin core member 21 in semi molten state, and the eventual solidification of the resin core member 21 finally secures the engagement pawls 84 in the resin core member 21.

Therefore, the integral attachment of the attachment core member 81 to the door trim main body 20 can be carried out at the same time as mold press forming the door trim main body 20, and the need for forming holes in the door trim main body and the work involved in the mounting of the engagement pawls 84 can be omitted so that the process of fabricating the door trim can be significantly reduced.

Figure 11:
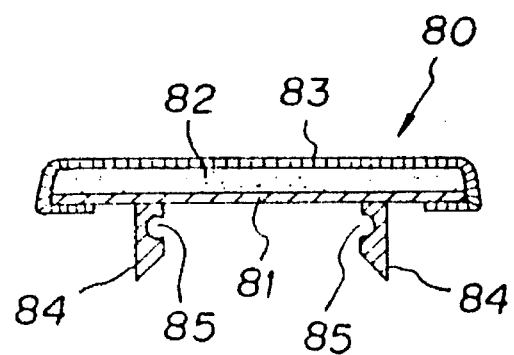
FIG. 11 is a sectional view of the attachment member according to a fourth embodiment of the present invention.
Figure 12:
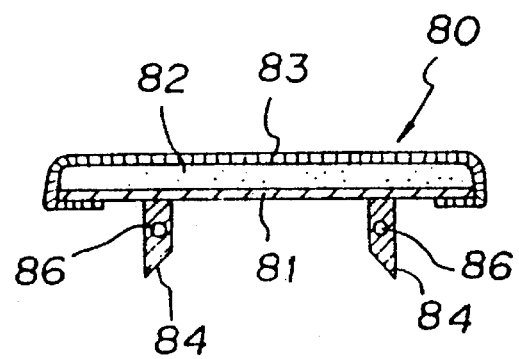
FIGS. 12 and 13 are views similar to FIG. 11 showing different embodiments of the means for preventing the disengagement of the engagement pawls from the resin core member.

Thus, the present embodiment is characterized by the securing or anchoring of the engagement pawls 84 provided in the attachment core member 81 of the attachment member 80 in the resin core member 21 of the door trim main body 20. To further improve the strength of securing the engagement pawls 84, it is possible to provide notches 85 in the engagement pawls 84 as illustrated in FIG. 11, and through holes 86 in the engagement pawls 84 as illustrated in FIG. 12 so as to achieve a favorable anchoring effect to more securely embed the engagement pawls 84 in the resin core member 21.

Figure 13:
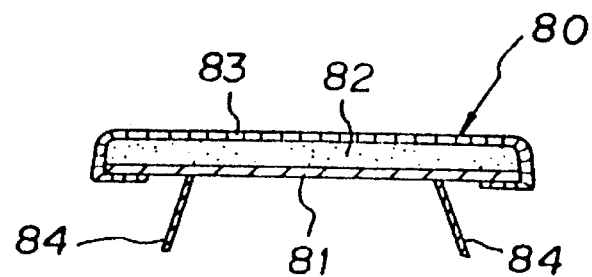
Figure 14:
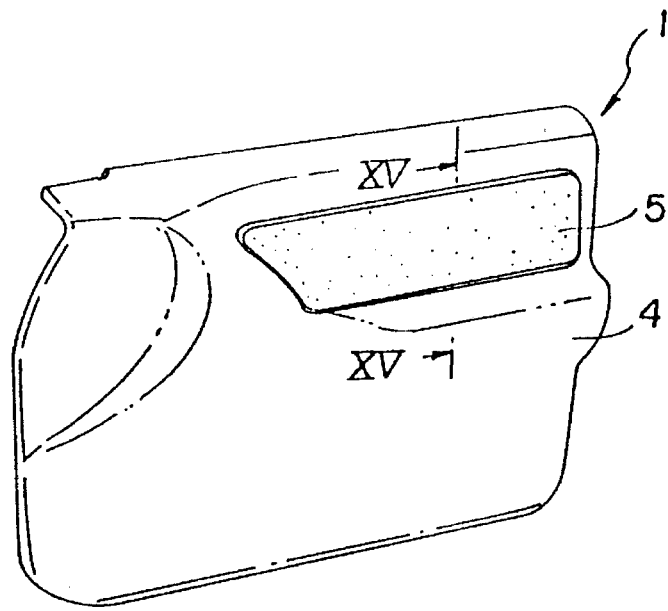
FIG. 14 is a perspective view showing a conventional automotive door trim.
Figure 15:
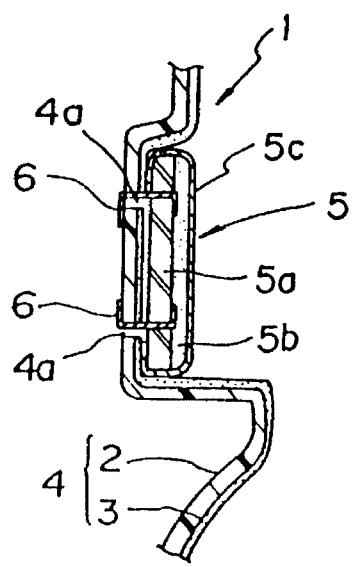
FIG. 15 is a sectional view taken along line XV–XV of FIG. 14.

As illustrated in FIG. 13, the engagement pawls 84 may be provided with an angle of 10 to 20 degrees with respect to the direction of mounting the attachment member so that the engagement pawls 84 may not easily come off from the resin core member 84.

As an alternative embodiment, it is possible to use light weight attachment core member such as hard board instead of the attachment core member 81 made of steel plate in the previous embodiment, and, in this case, the engagement pawls 84 may be separately provided in and fixedly secured to the attachment core member 81 by any suitable known means.

Thus, the embodiments illustrated in FIGS. 7 and 11 through 13 offer the following advantages in place of or in addition to the advantages of the previous embodiments:

(4) Since the automotive door trim of the present invention allows the attachment member to be attached to the trim main body more securely than the conventional structure of bending the attachment pawls by anchoring the engagement pawls provided in the attachment core member in the resin core member of the door trim main body, it is possible to prevent the attachment member from becoming wobbly, prevent the creation of a gap between the peripheral part of the attachment member and the trim main body, improve the appearance of the peripheral part, and ensure a secure attachment.

Although the present invention has been described in terms of preferred embodiments thereof, it is obvious to a person skilled in the art that various alterations and modifications are possible without departing from the scope of the present invention which is set forth in the appended claims.

What we claim is:

1. A method for fabricating an automotive interior component comprising a resin core member, a surface skin member integrally covering said resin core member, and an attachment member attached to a surface of the surface skin member, comprising the steps of:

providing a plurality of suitably located openings in the surface skin member within the periphery thereof;

retaining said surface skin member between upper and lower dies;

securing the attachment member on a die surface of said upper die;

supplying substantially molten resin material from a gate provided in the lower die;

mold press forming the automotive trim component into a curved contoured shape by engaging the upper and lower dies;

pushing the molten resin through the plurality of openings so that the molten resin material comes into contact with the attachment member, wherein the attachment member has a smaller surface area than the surface skin member; and allowing the molten resin material to solidify into a resin core member such that the resin core member is securely attached to the attachment member.

2. The method according to claim 1, wherein the openings in said surface skin member are located in a region spaced inwardly from a peripheral edge of the attachment member.

3. The method according to claim 1, wherein said mold press forming step and said pushing step occur at substantially the same time.

4. The method according to claim 1, wherein the resin core is formed into a contoured shaped during said pushing step and said allowing step.

* * * * *